(12) United States Patent
Lopez et al.

(10) Patent No.: US 11,858,427 B2
(45) Date of Patent: Jan. 2, 2024

(54) PED HOLDER ARM CONCEPT

(71) Applicant: Safran Seats USA LLC, Gainesville, TX (US)

(72) Inventors: Juan Lopez, Chihuahua (MX); David Morales, Chihuahua (MX); Kristyan Escobar, Chihuahua (MX)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 17/796,965

(22) PCT Filed: Feb. 6, 2020

(86) PCT No.: PCT/US2020/016911
§ 371 (c)(1),
(2) Date: Aug. 2, 2022

(87) PCT Pub. No.: WO2021/158221
PCT Pub. Date: Aug. 12, 2021

(65) Prior Publication Data
US 2023/0054168 A1   Feb. 23, 2023

(51) Int. Cl.
*B60R 11/02*   (2006.01)
*B64D 11/00*   (2006.01)
*B60R 11/00*   (2006.01)

(52) U.S. Cl.
CPC .......... *B60R 11/02* (2013.01); *B60R 11/0241* (2013.01); *B60R 11/0252* (2013.01); *B60R 2011/0015* (2013.01); *B64D 11/00152* (2014.12)

(58) Field of Classification Search
CPC ............................. B60R 11/02; B60R 11/0241
See application file for complete search history.

(56) References Cited

U.S. PATENT DOCUMENTS

2003/0184957 A1   10/2003   Stahl et al.
2018/0111691 A1*   4/2018   Van Liere

FOREIGN PATENT DOCUMENTS

EP   2569187 A2   3/2013
EP   2726373 A1   5/2014
JP   2014172557 A   9/2014

OTHER PUBLICATIONS

International Patent Application No. PCT/US2020/016911, International Search Report and Written Opinion, dated Sep. 1, 2020.

* cited by examiner

*Primary Examiner* — Anthony D Barfield
(74) *Attorney, Agent, or Firm* — Kilpatrick Townsend & Stockton LLP

(57) ABSTRACT

Described is a passenger seat having a supporting device for holding a portable electronic device coupled to a seat back of the passenger seat. The support includes at least one arm having a first position and a second position, and a base coupled to the arm, having a stowed position and a deployed position. In the first position, the arm may be oriented along the seat back and in the second position the arm may extend away from the seat back such that the base is spaced away from the seat back. In the deployed position, the base may extend from an end of the arm such that the base is positioned at a non-zero angle with respect to the arm.

10 Claims, 8 Drawing Sheets

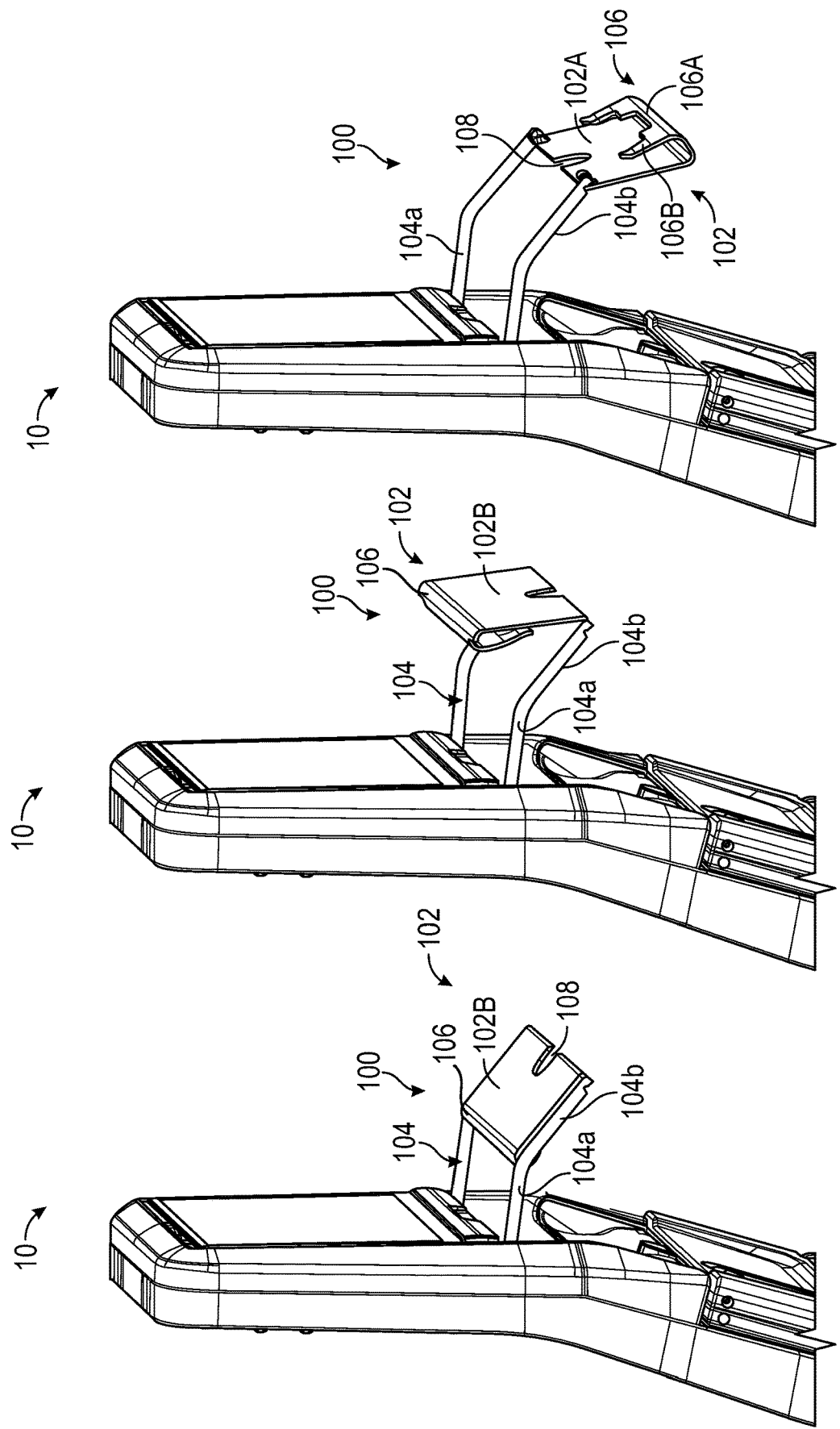

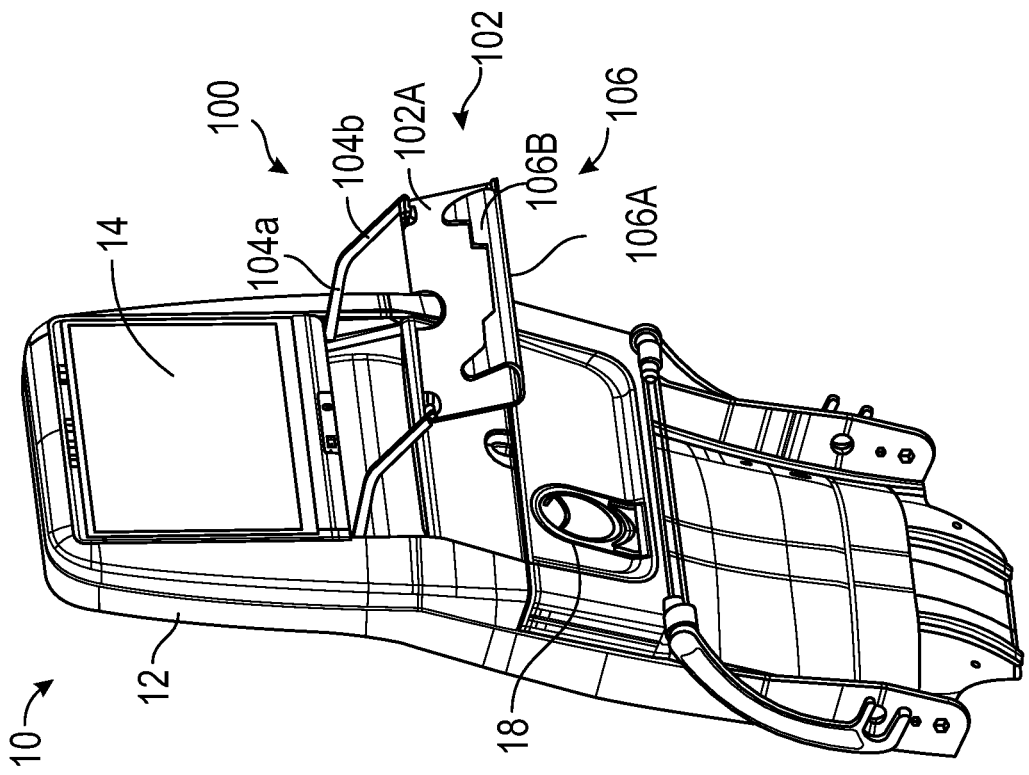
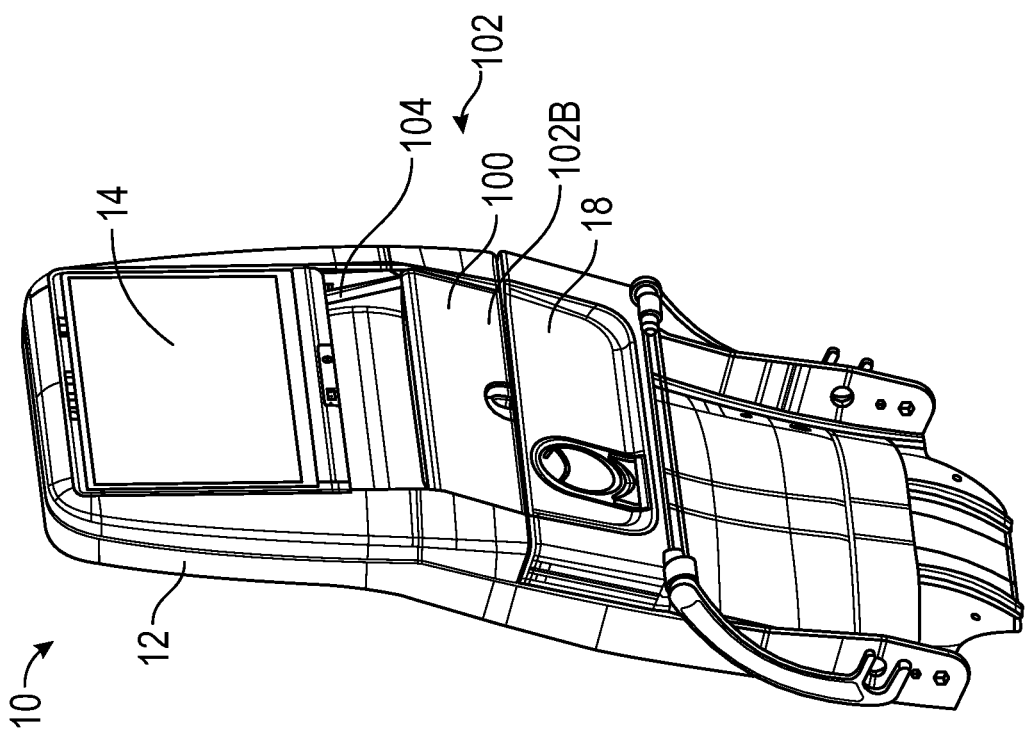
FIG. 4A
FIG. 4B

PED HOLDER ARM CONCEPT

FIELD OF THE INVENTION

The field of the invention relates to portable electronic device holders for passenger vehicle seats.

BACKGROUND

In many instances, passenger vehicles, such as aircraft, buses, trains, ships, and automobiles, include passenger seats with a wide assortment of portable electronic and entertainment options to encourage passengers to remain seated as much as possible during transport for safety, crew mobility, and to enable efficient cabin service. Some passenger seats may provide video and audio entertainment, including television, video games, internet access, and other on-board entertainment ("OBE") or in-flight entertainment ("IFE") components. Typically, these entertainment devices are mounted in the seat backs and arm rests of the passenger seats. A part of these systems commonly involves a screen, as a visual and/or touch interface, usually located in the back of the seat located before the passengers, and commonly located at an angle and position ideal for the passenger to watch the video screen while seated.

Recently, improvements in other devices such as tablets and smartphones have increased the use of these other devices during flight. With the advent of portable electronic devices ("PEDs"), such as tablet computers, cell phones, smart phones, handheld video game systems, personal digital assistants, palmtop computers, DVD players, data and audio-video media, multi-media enabled devices, and other similar electronic devices, many passengers prefer to use their own PEDs, rather than the OBE or IFE components that are mounted in the passenger seats. The rate at which PEDs, namely cell phones, portable computers, personal digital assistants ("PDAs"), have been evolving has been exponential. These devices are constantly increasing in functions and decreasing/altering in size, making them more portable and, at the same time, able to perform more tasks. This evolution has led to passengers carrying their personal information and media on these devices with the expectation of using them while traveling. Some systems have been developed to enable the use of PEDs in conjunction with a seat back. However, there remains a need for a support system that accommodates existing IFE systems for passengers that do not employ their own PEDs.

In order to view such devices, passengers must currently hold the devices, use third-party device holders, or prop the devices on the tray tables, but it is difficult to position the devices at a proper viewing angle. In view of the shortcomings of existing devices, there is a need for a support system for PEDs that is available and adaptable to a wide range of PED sizes, shapes, and thicknesses. There is also a need for a support system that does not pose a safety hazard to passengers. There is also a need for a support system that accommodates a suitable viewing angle, or that can accommodate adjustments to a viewing angle for the comfort of a passenger.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a support for holding a portable electronic device includes at least one arm coupled to a seat back and a base coupled to the at least one arm. The arm may include a first position and a second position, and the base may include a stowed position and a deployed. When the arm is in the first position, the arm may be oriented along the seat back such that the base is disposed proximate the seat back. When the arm is in the second position, the arm may extend from the seat back such that the base is spaced away from the seat back. When the base is in the deployed position, the base may extend from an end of the arm such that the base is positioned at a non-zero angle with respect to the arm.

In some embodiments, the arm further includes a first end and a second end. The arm may be coupled to the seat back at the first end and coupled to the base at the second end. When the base is in the stowed position, a lower end of the base may be positioned between the first end and the second end of the arm. When the arm moves between the first and second position, the second end of the arm may move along an arcuate path.

In some embodiments, the seat back further includes at least one slot. The arm may translate within the slot to move between the first position and the second position.

In some embodiments, the arm includes a first section and a second section. The first section and the second section may be oriented at a non-zero angle with respect to each other, and the first section may be coupled to the seat back while the second section is coupled to the base.

According to certain embodiments of the present invention, a support for holding a portable electronic device includes at least one arm having a first end and a second end and a base coupled to the second end of the arm. The arm may have a first position and a second position, and the base may have a stowed position and a deployed position. When the arm is in the first position, the arm may be positioned substantially vertically such that the base is disposed proximate the seat back. When the arm is in the second position, the arm may extend from the seat back such that the arm forms a non-zero angle with respect to the seat back and the base is spaced away from the seat back. When the base is in the stowed position, a lower end of the base may be positioned between the first end and the second end of the arm. When the base is in the deployed position, the base may be oriented at a non-zero angle with respect to the second end of the arm.

In some embodiments, the seat back may further include at least one slot and the arm may translate within the slot to move between the first position and the second position.

In some embodiments, the seat back further includes a tray table having a deployed position. When the tray table is in the deployed position, the arm can move between the first and second positions and the base can move between the stowed and deployed positions.

In some embodiments, the base is pivotally coupled to the second end of the arm such that when the base moves between the stowed and deployed position, the lower end of the base moves along an arcuate path while an upper end of the base rotates with respect to the second section of the arm.

In some embodiments, the base further includes a forward surface for receiving a rear surface of the portable electronic device and a rearward surface opposite the forward surface. When the base is in the stowed position, the forward surface may face toward the seat back and when the base is in the deployed position, the forward surface of the base may face away from the seat back.

In some embodiments, the support further includes an angle adjustment mechanism coupled between the second end of the arm and the base.

According to certain embodiments of the present invention, a support for holding a portable electronic device includes at least one arm having a first position and a second position and a base pivotably coupled to the arm, having a stowed position and a deployed position. When the arm is in the first position, the base may be disposed proximate the seat back and when the arm is in the second position, the base may be spaced apart from the seat back. When the base is in the stowed position, a forward surface of the base may face towards the seat back and when the base is in the deployed position, the forward surface may face away from the seat back. Moreover, when the base moves between the stowed and deployed positions, the base may rotate with respect to an end of the arm.

In some embodiments, the seat back further includes at least one slot and the arm translates within the slot to move between the first position and the second position. The seat back may further include a tray table having a deployed position such that the arm can move between the first and second positions while the tray table is deployed and the base can move between the stowed and deployed positions while the tray table is deployed.

In some embodiments, the arm includes a first section and a section. The first section and the second section may be oriented at a non-zero angle with respect to each other and the first section may be coupled to the seat back while the second section is coupled to the base. When the base is in the stowed position, the base may be oriented along a same axis as the second section of the arm. When the arm is in the first position, the first section and the second section may be positioned along the seat back. When the arm is in the second position, the first section may be substantially horizontal with respect to the seat back.

In some embodiments, when the first arm moves between the first and second positions, an end of the arm moves along an arcuate path. When the base moves between the stowed and deployed positions, a lower end of the base may move along an arcuate path.

In some embodiments, the arm further includes two arms.

BRIEF DESCRIPTION OF THE DRAWINGS

FIGS. 3A-3C are side views of the passenger seat of FIG. 1 illustrating the movement of the PED holder from the intermediate position to a deployed position.

FIGS. 4A-4B are perspective views of the passenger seat of FIG. 1 illustrating the movement of the PED holder from the stowed position to the deployed position.

DETAILED DESCRIPTION

Figure 1:
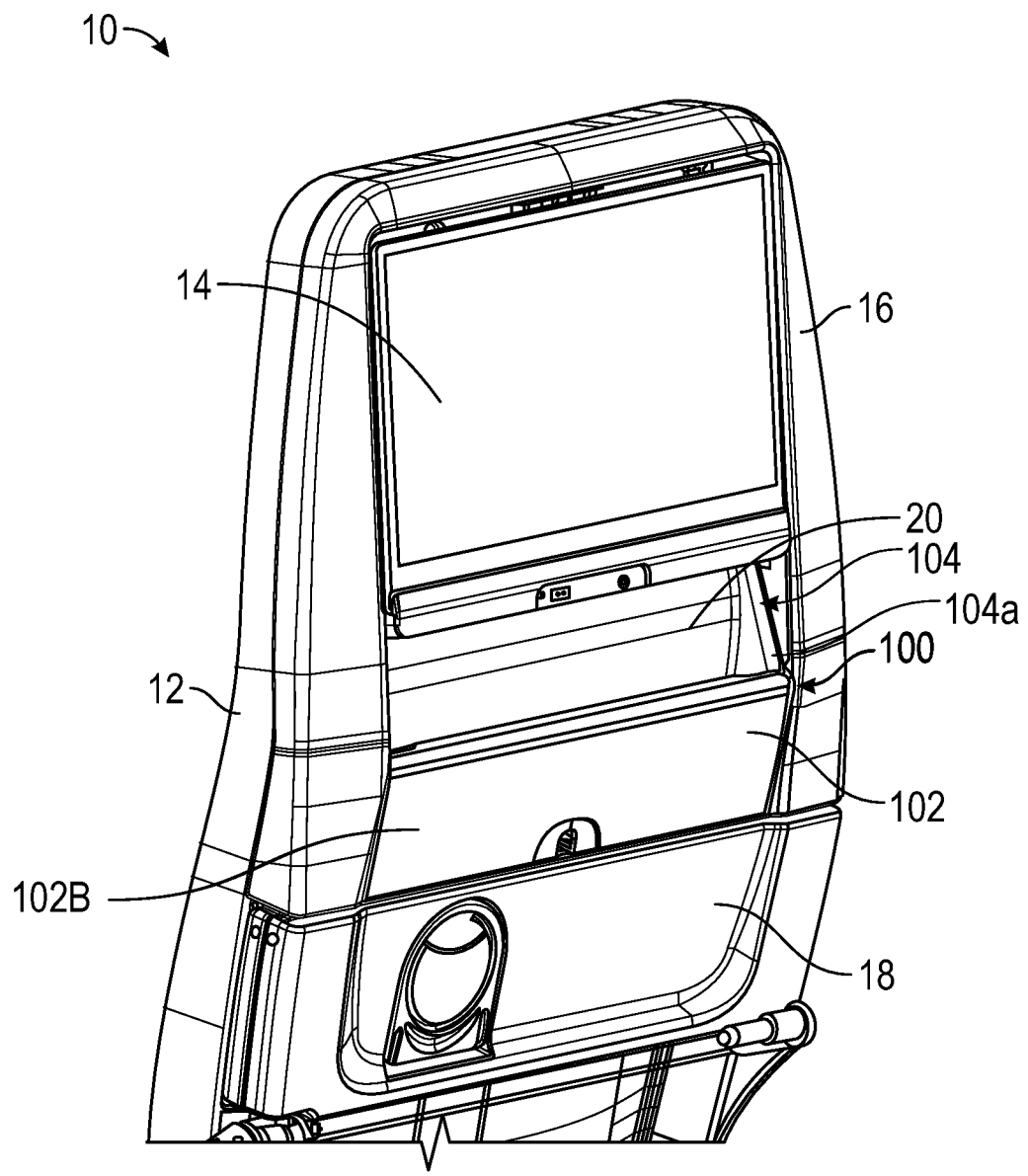
FIG. 1 is a perspective view of a passenger seat with a PED holder in a stowed position, according to certain embodiments of the present invention.
Figure 2B:
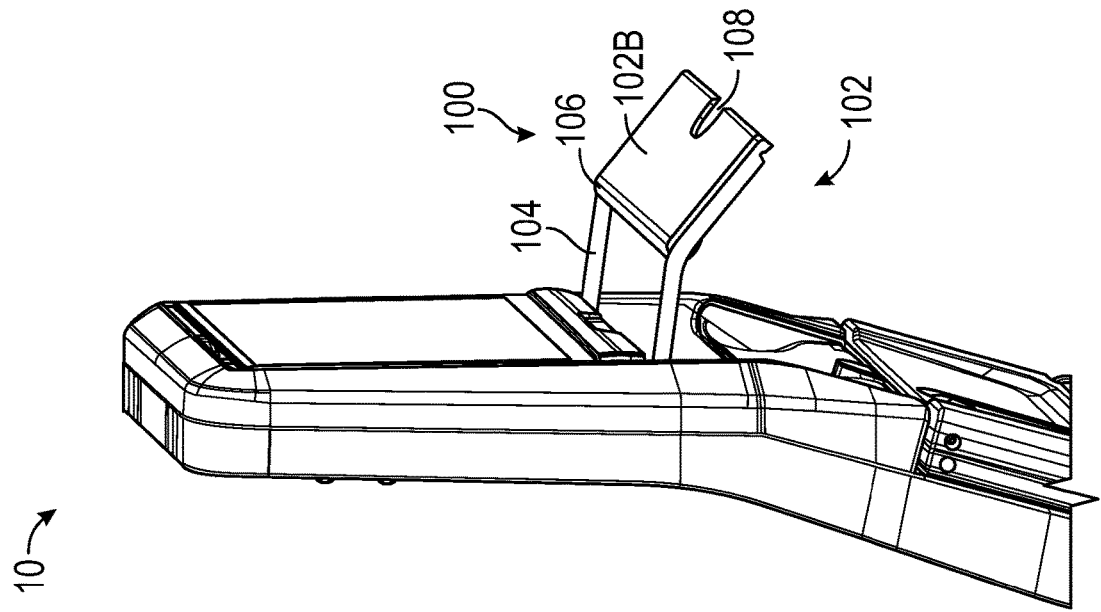
FIG. 2B is a side view of the passenger seat of FIG. 1 illustrating the PED holder in an intermediate position.
Figure 2A:
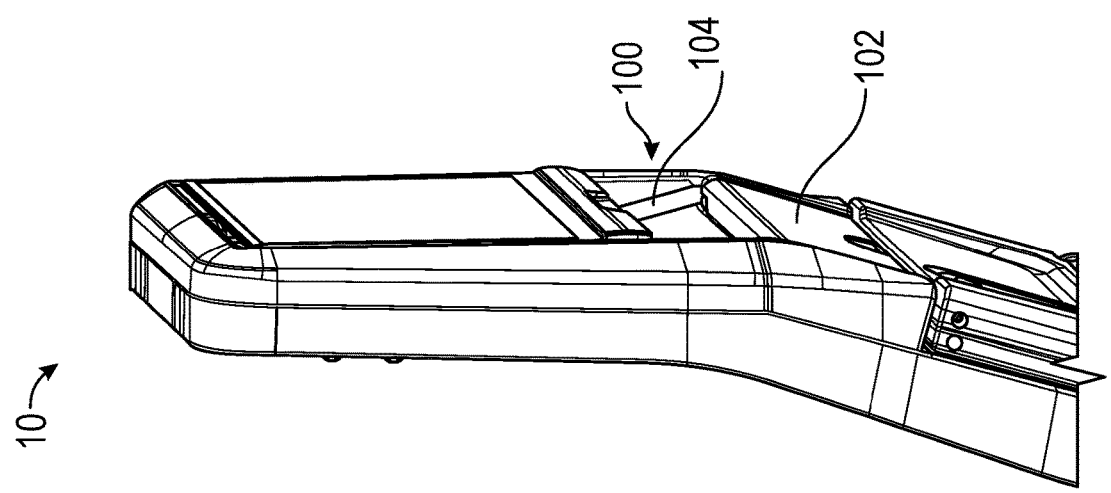
FIG. 2A is a side view of the passenger seat of FIG. 1 illustrating the PED holder in the stowed position.
Figures 5A, 5B:
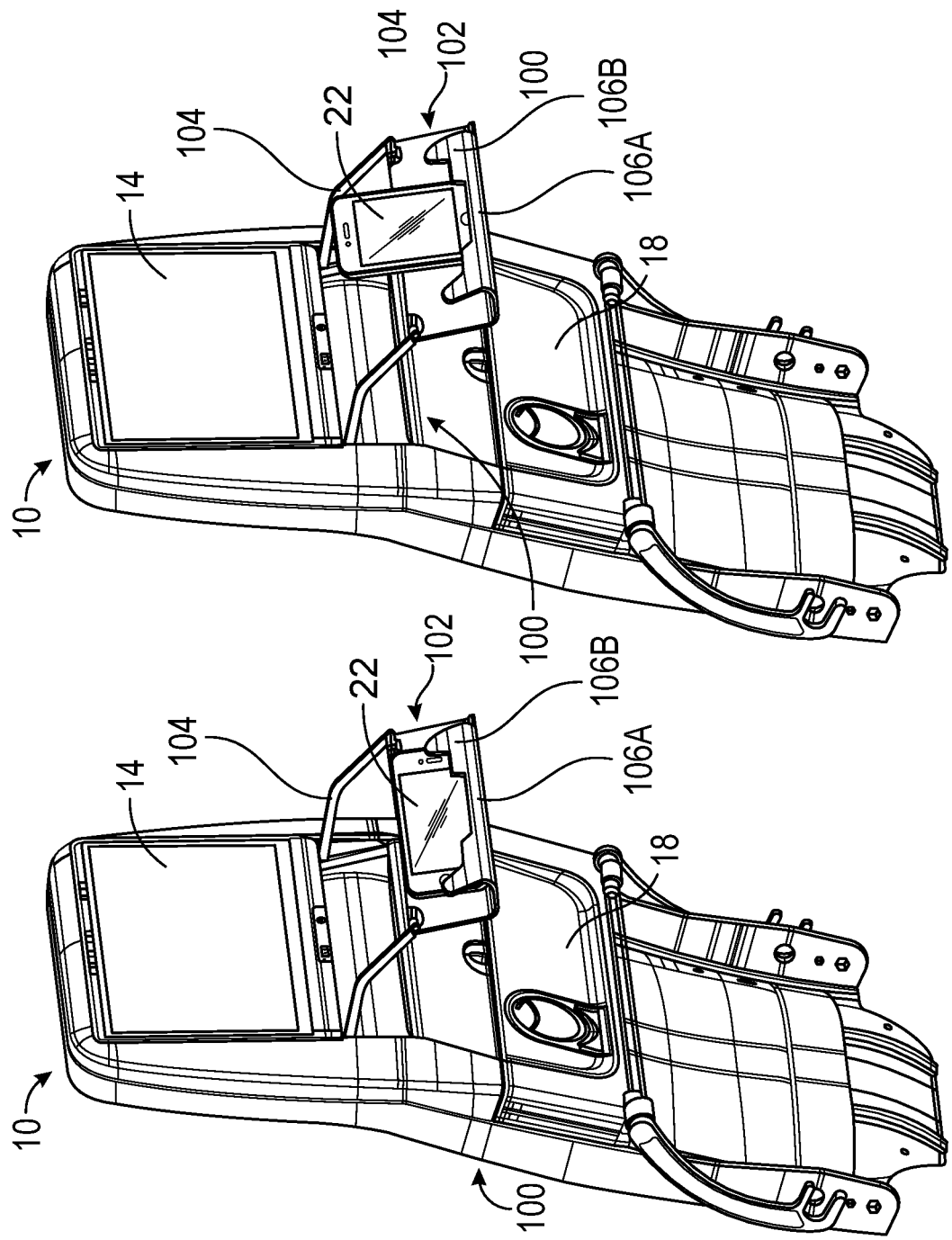
FIGS. 5A-5C are perspective views of the passenger seat of FIG. 1 illustrating the PED holder in the deployed position and supporting various types of PEDs.
Figure 5C:
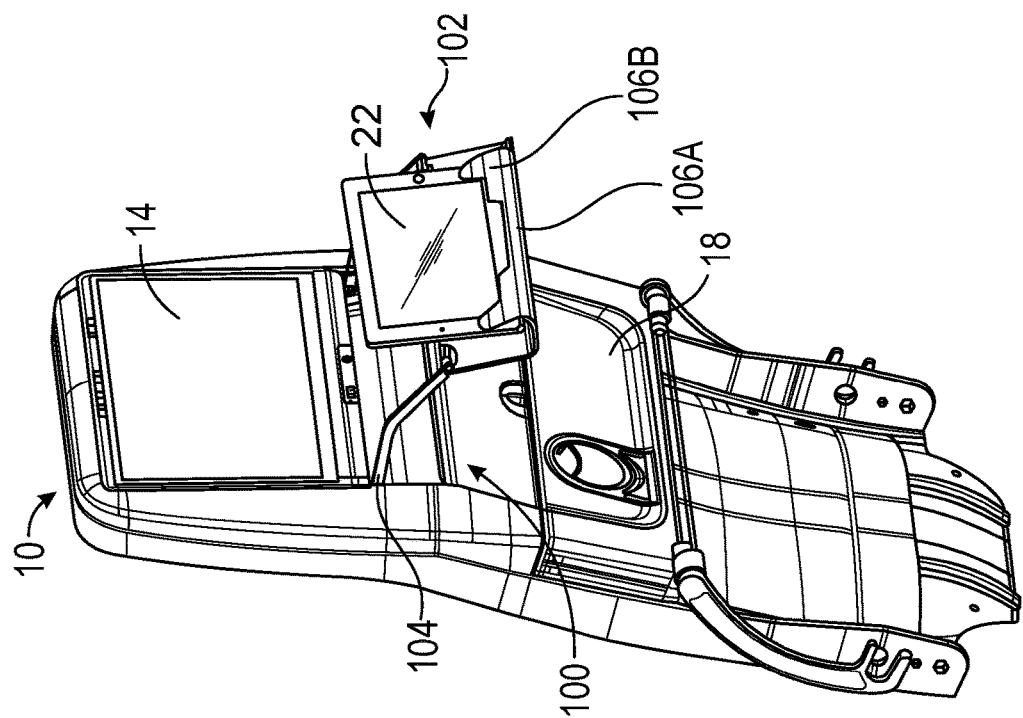

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide PED holders for passenger seats. While the PED holders are discussed for use with aircraft seats, they are by no means so limited. Rather, embodiments of the PED holders may be used in passenger seats or other seats of any type or otherwise as desired.

According to certain embodiments of the present invention, as shown in FIGS. 1-7B, a seat 10 comprises a support 100 coupled to a seat back 12 and that can hold a PED 22. The PED 22 should be not be considered limiting on the current disclosure and may be various suitable PEDs including, but not limited to, tablet computers, cell phones, smart phones, handheld video game systems, personal digital assistants, palmtop computers, DVD players, data and audio-video media, multi-media enabled devices, and/or other similar electronic devices. In FIG. 5A, the PED 22 is a handheld video game system, in FIG. 5B, the PED 22 is a cell phone, and in FIG. 5C the PED 22 is a tablet computer. In other examples, the support 100 may support various other types of PEDs 22 as desired.

In some embodiments, as illustrated in FIGS. 1-5C, the seat 10 comprises a seat back 12 with a video shroud 16 having a monitor 14. The seat 10 may include a tray table 18 that pivots between a stowed position, in which the tray table 18 is positioned adjacent the seat back 12, and a deployed position, in which the tray table 18 is spaced apart from the seat back 12 such that a passenger can place articles on the tray table 18. The seat 10 may optionally include a literature pocket 20 positioned on the seat back 12, which provides space for a passenger to store various items, for example, magazines and books. It will be appreciated that the particular seat back 12 illustrated in FIGS. 1-5C and 7A-7B should not be considered limiting on the current disclosure, and the support 100 may be provided on various other types of seat back 12 with fewer or additional features as desired.

As illustrated in FIG. 1, for example, the support 100 is coupled to the seat back 12. The particular position of the support 100 on the seat back 12 illustrated in FIGS. 1-5C and 7A-7B should not be considered limiting on the current disclosure, and the support 100 may be positioned at various locations on the seat back 12 and/or at various positions relative to other components on the seat back 12. In the example of FIGS. 1-5C, the support 100 is positioned on the seat back 12 below the video shroud 16. As illustrated, in this example, the support 100 may be positioned such that the support 100 is located above the tray table 18 when the tray table is in the stowed position thereby allowing a passenger access to the support 100 when the tray table 18 is in the stowed position. Furthermore, the support 100 may be positioned forward of the literature pocket 20 such that a passenger may access the literature pocket 20 while the support is in the stowed position. As mentioned, in other examples, the support 100 may be at various other positions on the seat back 12 and/or relative to other components on the seat back 12 as desired.

In some embodiments, as illustrated, for example, in FIGS. 2A-3C, the support 100 may have move between a variety of positions including, but not limited to, a stowed position, an intermediate position, and a deployed position. As illustrated, for example in FIG. 2A, when the support 100 is in the stowed position, the support 100 may be positioned proximate the seat back 12. In this example, at least one arm 104 and a base 102 of the support 100 may be positioned proximate the seat back 12. In the intermediate position, as illustrated, for example in FIGS. 2B-3A, the support 100 may be spaced apart from the seat back 12 such that the arm 104 extends from the seat back 12 and the base 102 is spaced apart from the seat back. Moreover, in the intermediate position, the base 102 of the support 100 may be positioned proximate a section of the arm 104. Referring to FIGS. 3A-3C, the support 100 may move from the intermediate position to the deployed position, wherein the base 102 of the support 100 is pivoted with respect to the arm 104.

As described above, in some embodiments, and as illustrated, for example, in FIGS. 2B, 3A-3C, and 6-7B, the support 100 comprises at least one arm 104 and a base 102 that is pivotally coupled to the arm 104. The arm 104 may include a first end coupled to the seat back 12 and a second end coupled to the base 102. In some examples, the support 100 includes one arm 104. However, the number of arms 104 should not be considered limiting on the current disclosure. For example, in other cases, the support 100 includes two or more arms 104. As illustrated in FIGS. 2B and 3A-3C, the arm 104 may include a first section 104a and a second section 104b. The first section 104a of the arm 104 may include the first end of the arm 104 such that the first section 104a is coupled to the seat back 12. Similarly, the second section 104b of the arm 104 may include the second end of the arm 104 such that the second section 104b is coupled to the base 102. The first section 104a and the second section 104b may be oriented at a non-zero angle with respect to each other. For example, the angle between the first section 104a and the second section 104b, may range between 130° and 165°.

When the support 100 is moved from the stowed position to the intermediate position, the arm 104 may be selectively moved between a stowed position and a deployed position. FIGS. 1 and 4A illustrate an example of the arm 104 in the stowed position. In the stowed position, also referred to as a first position, the arm 104 may be positioned in close proximity to the seat back 12 such that the arm 104 is positioned adjacent and extends along the seat back 12. Moreover, in the stowed position, the first section 104a and the second section 104b may be positioned proximate to the seat back 12. In the deployed position, also referred to as a second position, the second section 104b may be spaced apart and extend in an aft direction from the seat back 12. Moreover, in the deployed position, the second section 104b may be spaced way from the seat back 12 thereby positioning the base 102 at a position spaced away from the seat back 12 and projecting the base 102 towards a seated passenger.

The arm 104 may be formed of materials including, but not limited to, aluminum, stainless steel, polycarbonate, polypropylene, other metallic materials, composite materials, combinations thereof, or any other suitable material. Moreover, the arm 104 may be pivotably coupled to the seat back 12 using various suitable mechanisms, including, but not limited to, threaded fasteners, hinges, nuts and bolts, pins, clips, rods, living hinges, combinations thereof, or any other mechanisms allowing for pivoting movement of the arm 104 relative to the seat back 12. Furthermore, in some embodiments, the arm 104 may be integrally formed with the seat back 12.

As described above, the support 100 may include the base 102 coupled to the second section 104b of the arm 104. In some embodiments, as illustrated in FIGS. 1-5C the base 102 is capable of receiving, supporting, and/or securing the PED 22. Similar to the arm 104, the base 102 may also have a stowed position and a deployed position, which will be described in further detail. The base 102 may include a front surface 102A and a rear surface 102B, as illustrated in FIGS. 1-3C and 6. When the PED 22 is supported by the base 102, a rear surface of the PED 22 may rest against the rear surface 102B and a front surface of the PED 22 may contact the front surface 102A, although it need not in other examples. As illustrated in FIGS. 3C, 4B, 5A-5C, and 6 a retaining ledge 106 extends outwards from the base 102 opposite from the arm(s) 104. When the support 100 is used by a passenger, the retaining ledge 106 may be used to support and/or retain the PED 22 on the support 100. As illustrated in FIGS. 3C, 4B, 5A-5C, and 6, the retaining ledge 106 may include a middle portion 106A and end portions 106B. The end portions 106B may extend upward from a bottom end of the base 102 higher than the middle portion 106A. Moreover, the retaining ledge 106 may include a curved profile such that a portion of the retaining ledge 106 curves toward the front surface 102A. As such, when the PED 22 is placed within the base 102, the curved portion may contact a front surface of the PED 22, thereby securing the PED 22 within the base 102. In other examples, the retaining ledge 106 may have other suitable profiles as desired. When the PED 22 is supported on the support 100, the PED 22 may be retained between the base 102 and the middle portion 106A and the end portions 106B. In some cases, because the middle portion 106A may extend upwards to a lower height with respect to the end portions 106B, a passenger may be able to view a substantial portion of the screen of the PED 22 with minimal obstruction from the retaining ledge 106. The middle portion 106A and the end portions 106B, may be integrally formed, or, alternatively, the middle portion 106A and the end portions 106B may be formed of multiple structures that are attached by any suitable means. Furthermore, the base 102 may be formed such that the rear surface 102B and the front surface 102A are integrally formed from one unitary piece. Alternatively, the front surface 102A and the rear surface 10B may be separately formed and attached by any suitable means. Similarly, while the retaining ledge 106 is described as having the middle portion 106A and end portions 106B at varying heights, the middle portion 106A and the end portions 106B may be have a uniform height.

The base 102 may further include an opening 108 formed along at least a portion of an edge of the base 102 that the passenger may grasp to assist in moving the base 102 between the stowed and deployed positions, which are discussed in greater detail below. In some embodiments, the opening 108 is formed along a top edge of the base 102.

However, the opening 108 may be formed along any edge and/or any other portion of the base 102 and/or the retaining ledge 106 as desired. Similarly, in some embodiments, the opening 108 may have a semi-circle shape. However, the opening 108 may have any suitable shape as desired, including but not limited to, rectangular, square, triangle, or any other suitable shape. Furthermore, the opening 108 may have a closed perimeter such that the opening 108 is spaced away from the edge of the base 102.

Figure 6:
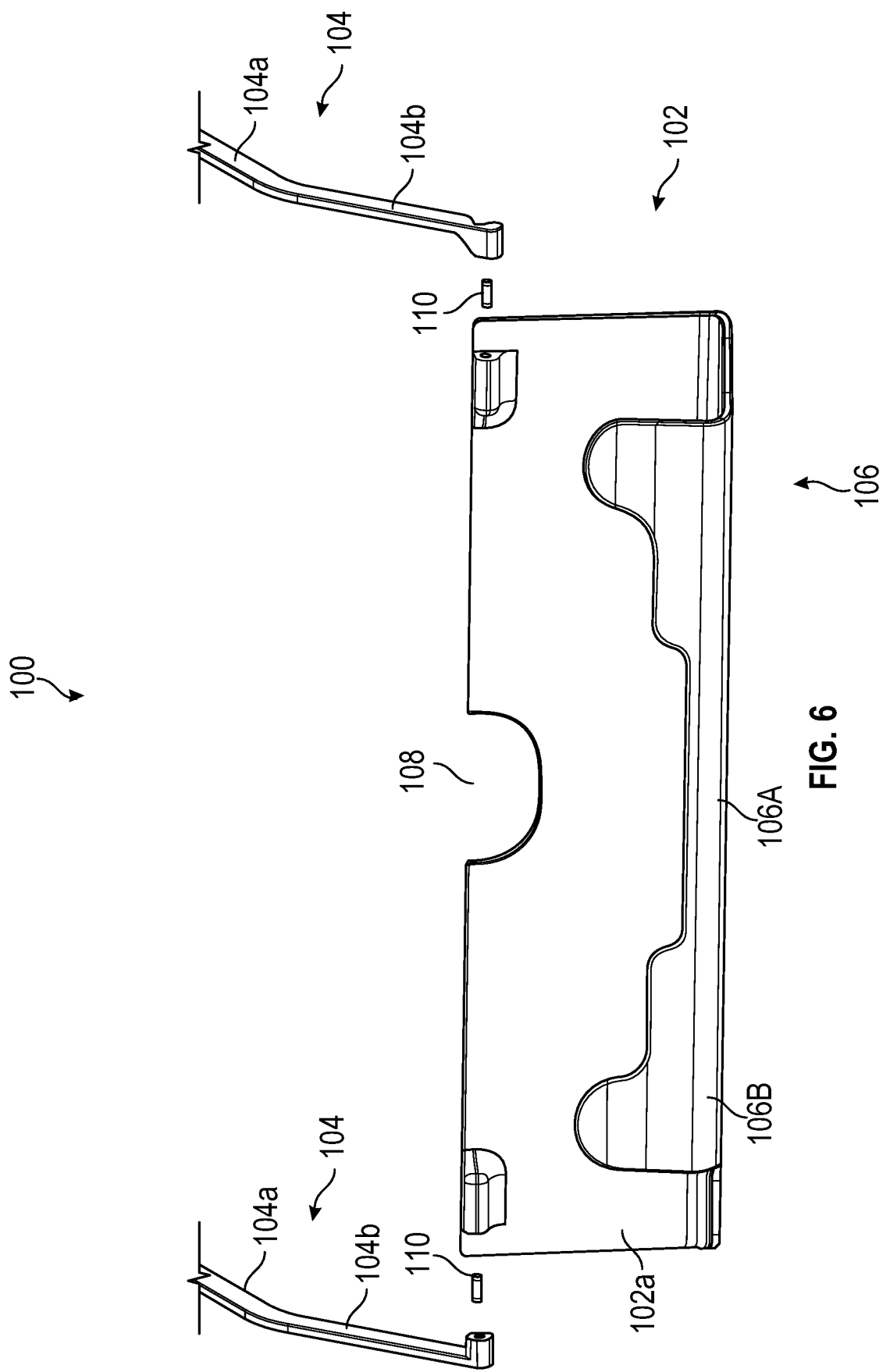
FIG. 6 is an exploded view of the PED holder of FIG. 1 illustrating an angle adjustment member.

In some examples, as illustrated in FIG. 6, the base 102 may further include an angle adjustment member 110 for adjusting the angle of the base 102 with respect to the second end of the arm 104. The angle adjustment member 110 may be disposed between the second end of the arm 104 and an upper end of the base 102. However, the particular position of the angle adjustment member 110 with respect to the base 102, illustrated in FIG. 6, should not be considered limiting on the current disclosure, and the angle adjustment member 110 may be positioned at various locations on the base 102 and/or at various positions relative to other components on the base 102 and/or the arm 104. In some embodiments, the angle adjustment member 110 may be a torque hinge. However, the angle adjustment member 110 may include various other types of adjustment members for example, but not limited to, a torsion spring, compression spring, extension spring, leaf spring, a detent hinge, a dampened hinge or any other suitable device.

As mentioned, the base 102 may move between stowed and deployed positions. Referring to FIGS. 1-3A, in the stowed position, the base 102 may be positioned in close proximity to the second section 104b of the arm 104. In particular, in some examples, longitudinal edges of the base 102 between a top end and a bottom end of the base 102, are in close proximity to the second section 104b of the arm 104. In the stowed position, the base 102 may be oriented such that the rear surface 102B faces away from the seat back 12 and the front surface 102A faces towards the seat back 12. Moreover, a lower end of the retaining ledge 106 may be positioned between the first end and the second end of the arm 104 such that the lower end of the retaining ledge 106 is oriented closer to the seat back 12 than an upper end of the base 102. Furthermore, in the stowed position, the base 102 may be oriented along in a same plane as a plane of second section of the 104b of the arm 104 such that the base 102 and the second section 104b of the arm 104 extend along a same axis (or parallel axes). In the deployed position, the base 102 may be spaced apart from the second section 104b of the arm 104. In particular, in some examples, the longitudinal edges are spaced apart from the second section 104b of the arm 104 when in the base 102 is in the deployed position. In some examples, when the base 102 is in the deployed position, the base 102 may be a distance from the seat back 12. In some examples, the distance ranges between 3 inches and 9 inches, although in other examples the distance may be less than 3 inches or greater than 9 inches. In the deployed position, the base may be spaced away from the seat back 12 and oriented such that the rear surface 102B faces towards the seat back 12 and the front surface 102A faces away from the seat back 12. Moreover, in the deployed position, the base 102 may be oriented in a different plane than the plane of the second section 104b of the arm 104 such that the base 102 and the second section 104b of the arm 104 lie in different axes. However, it is contemplated that the base 102 and the second section 104b of the arm 104 may lie in a same plane in other examples. In some examples, as illustrated for example in FIGS. 3A-3C, the base 102 may move between the stowed and deployed positions while the support 100 is in the intermediate position. However, in other examples, the base 102 may move between the stowed and deployed positions when the support is in the stowed position such that the arm 104 remains in close proximity to the seat back 12 while the base 102 is pivoted with respect to the arm 104 and spaced away from the seat back 12.

Figure 7B:
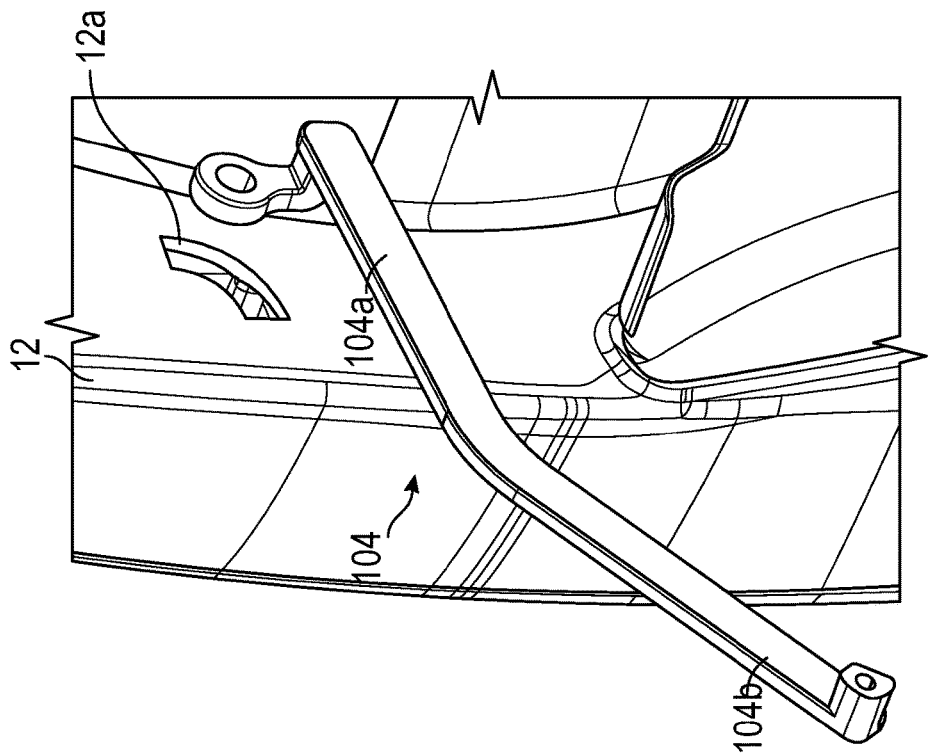
FIGS. 7A-7B are perspective views of the PED holder of FIG. 1 within a slot on a backrest of the passenger seat.
Figure 7A:
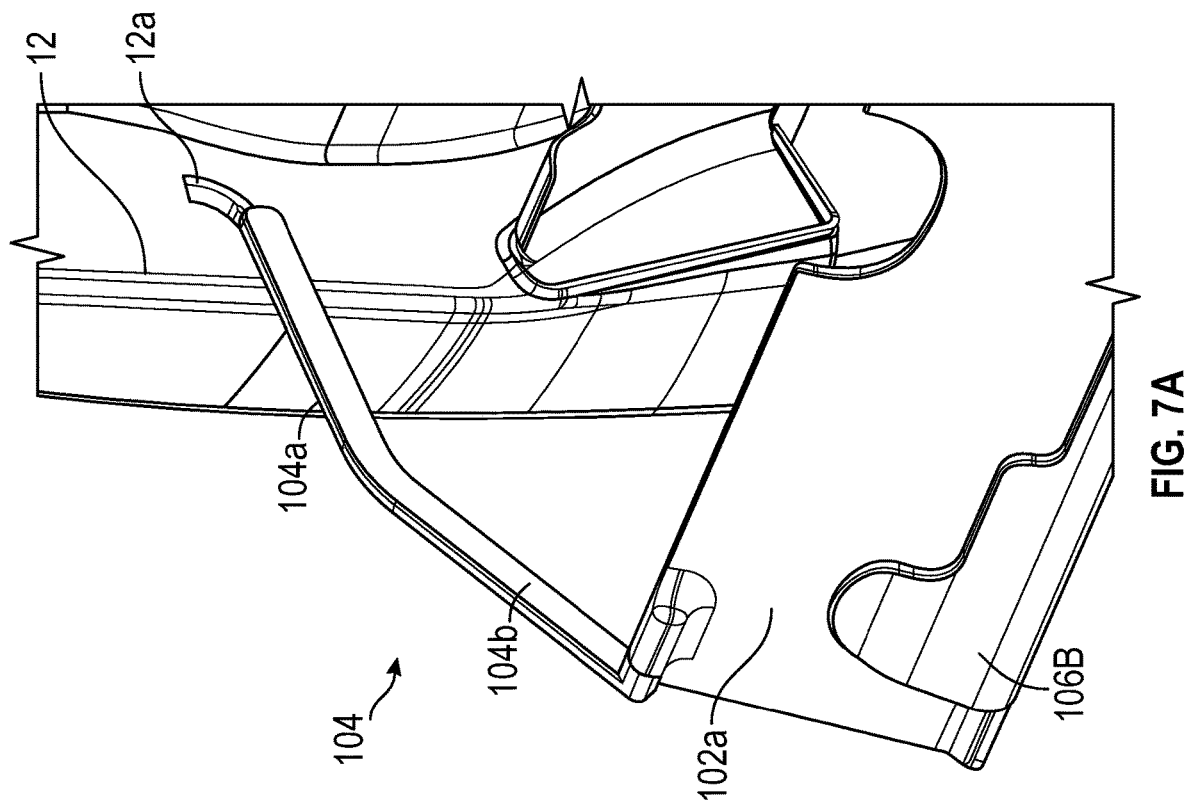

During operation, illustrated in FIGS. 2-3C, a passenger may move the support 100 from the stowed position to the intermediate positioning by gripping the base 102 at the opening 108 and pulling the base 102 in a direction away from the seat back 12 thereby moving the arm 104 from the stowed position to the deployed position. While, the figures illustrate the opening 108, this should not be considered limiting. In some embodiments, the base 102 may include other gripping portions, for example, but not limited to, a projection, a tab, a handle, a pocket or any other suitable surface capable of being gripped. As the passenger pulls the base 102 in a direction away from the seat back 12, the first end of the arm 104 may move away from the seat back 12 to the deployed position. In some examples, as illustrated in FIGS. 7A-7B, moving the arm 104 to the deployed position includes translating the first end of the arm within a slot 12a formed within the seat back 12. When the first end of the arm 104 reaches an end of the slot 12a, the arm 104 may be locked in the deployed position. As mentioned, in the deployed position, the second section 104b and the base 102 may be spaced away from the seat back 12. In some cases, as the arm 104 moves between the stowed and the deployed position, the second end of the arm 104 may move along an arcuate path. When the support is in the intermediate position, the arm 104 may be deployed and the base 102 may be in the stowed position such that the base 102 may be positioned at an angle with respect to the seat back 12. Moreover, the rear surface face of the base 102 may face away from the seat back 12. The passenger may then rotate the base 102 in a direction away from seat back 12 to the deployed position. As the base 102 rotates, the lower end of the base 102, or the retaining ledge 106, may move in an arcuate path while the upper end of the base 102 may rotate with respect to the second section 104b of the arm 104. Once the base 102 is in the deployed position, the passenger may further rotate the base 102 with respect to the arm 104 to a desired position. The base 102 may then be locked in the desired position via the angle adjustment member 110.

To return the base 102 to the stowed position, the passenger may rotate the base 102 with respect to the second end of the arm 104 in a direction towards the seat back 12 until the base 102 is oriented substantially in the same plane as the second section 104b such that the longitudinal edges of the base 102 extend in a same axis as the second section 104b of the arm 104. With the support 100 now in the intermediate position, the passenger may then move the support 100 to the stowed position. In some examples, this includes moving the base 102 in a direction towards the seat back 12 thereby causing the first end of the arm 104 to translate within the slot 12a and the second end of the arm 104 to travel along an arcuate path towards the seat back 12. The arm 104 and the base 102 may be oriented at a vertical position with respect to the seat back 12 such that each of the base 102 and the arm 104 may move between the stowed and deployed positions without interfering with operation or viewing of the monitor 14. Similarly, the arm 104 may be oriented with respect to the seat back such that the arm 104 and the base 102 may move between the stowed and deployed positions without interfering with the operation of the tray table 18. Therefore, in some embodiments, the passenger can move the arm 104 and the base 102 between the stowed and deployed positions while the tray table 18 is in the deployed position.

In the following, further examples are described to facilitate the understanding of the invention:

EXAMPLE A

A support for holding a portable electronic device comprising:
- at least one arm coupled to a seat back, wherein the at least one arm comprises a first position and a second position;
- a base coupled to the at least one arm, wherein the base comprises a stowed position and a deployed position;
- wherein, when the at least one arm is in the first position, the at least one arm is oriented along the seat back such that the base is disposed proximate the seat back;
- wherein, when the at least one arm is in the second position, the at least one arm extends from the seat back such that the base is spaced away from the seat back; and
- wherein, when the base is in the deployed position, the base extends from an end of the at least one arm such that the base is positioned at a non zero angle with respect to the at least one arm.

EXAMPLE B

The support of any of the proceeding or subsequent examples, wherein the at least one arm further comprises a first end and a second end;
- wherein the at least one arm is coupled to the seat back at the first end and coupled to the base at the second end.

EXAMPLE C

The support of any of the proceeding or subsequent examples, wherein, when the base is in the stowed position, a lower end of the base is positioned between the first end and the second end of the at least one arm.

EXAMPLE D

The support of any of the proceeding or subsequent examples, wherein, when the at least one arm moves between the first and second positions, the second end of the at least one arm moves in an arcuate path.

EXAMPLE E

The support any of the proceeding or subsequent examples, wherein the seat back further comprises at least one slot; and
- wherein, the at least one arm translates within the at least one slot to move between the first position and the second position.

EXAMPLE F

The support of any of the proceeding or subsequent examples, wherein the at least one arm comprises a first section and a second section;
- wherein the first section and the second section are oriented at a non-zero angle with respect to each other; and
- wherein, the first section is coupled to the seat back and the second section is coupled to the base.

EXAMPLE G

A support for holding a portable electronic device comprising:
- at least one arm having a first end and a second end, wherein the at least one arm is coupled to a seat back and has a first position and a second position;
- a base coupled to the second end of the at least one arm, wherein the base comprises a stowed position and a deployed position,
- wherein, when the at least one arm is in the first position, the at least one arm is positioned substantially vertically such that the base is disposed proximate the seat back;
- wherein, when the at least one arm is in the second position, the at least one arm extends from the seat back such that the at least one arm forms a non-zero angle with respect to the seat back and the base is spaced away from the seat back;
- wherein, when the base is in the stowed position, a lower end of the base is positioned between the first end and the second end of the at least one arm; and
- wherein, when the base is in the deployed position, the base is oriented at a non-zero angle with respect to the second end of the at least one arm.

EXAMPLE H

The support of any of the proceeding or subsequent examples, wherein the seat back further comprises at least one slot; and
- wherein, the at least one arm translates within the at least one slot to move between the first position and the second position.

EXAMPLE I

The support of any of the proceeding or subsequent examples, wherein the seat back further comprises a tray table; and
- wherein, the at least one arm can move between the first and second positions while the tray table is in a deployed position; and
- wherein, the base can move between the stowed and deployed positions while the tray table is in the deployed position.

EXAMPLE J

The support of any of the proceeding or subsequent examples, wherein the base is pivotally coupled to the second end of the at least one arm; and
- wherein, when the base moves between the stowed and deployed positions, the lower end of the base moves in arcuate path while an upper end of the base rotates with respect to the second section of the at least one arm.

EXAMPLE K

The support of any of the proceeding or subsequent examples, wherein the base further comprises a forward surface for receiving a rear surface of the portable electronic device and a rearward surface opposite the forward surface; and wherein, when the base is in the stowed position, the forward surface of the base faces towards the seat back; and wherein, when the base is in the deployed position, the forward surface of the base faces away from the seat back.

EXAMPLE L

The support of any of the proceeding or subsequent examples, further comprising an angle adjustment mechanism coupled between the second end of the at least one arm and the base.

EXAMPLE M

A support for holding a portable electronic device comprising:
- at least one arm coupled to a seat back having a first position and a second position;
- a base pivotably coupled to the at least one arm, wherein the base comprises a stowed position and a deployed position;
- wherein, when the at least one arm is in the first position, the base is disposed proximate the seat back,
- wherein, when the at least one arm is in the second position, the base is spaced apart from the seat back,
- wherein, when the base is in the stowed position, a forward surface of the base faces towards the seat back;
- wherein, when the base is in the deployed position, the forward surface of the base faces away from the seat back; and
- wherein, when the base moves between the stowed and deployed positions, the base rotates with respect to an end of the at least one arm.

EXAMPLE N

The support of any of the proceeding or subsequent examples, wherein the seat back further comprises at least one slot; and
- wherein, the at least one arm translates within the at least one slot to move between the first position and the second position.

EXAMPLE O

The support of any of the proceeding or subsequent examples, wherein the seat back further comprises a tray table; and
- wherein, the at least one arm can move between the first and second positions while the tray table is in a deployed position; and
- wherein, the base can move between the stowed and deployed positions while the tray table is in the deployed position.

EXAMPLE P

The support of any of the proceeding or subsequent examples, wherein the at least one arm comprises a first section and a second;
- wherein the first section and the second section are oriented at a non-zero angle with respect to each other; and wherein, the first section is coupled to the seat back and the second section is coupled to the base.

EXAMPLE Q

The support of any of the proceeding or subsequent examples, wherein when the base is in the stowed position, the base is oriented along a same axis as the second section of the at least one arm.

EXAMPLE R

The support of any of the proceeding or subsequent examples, wherein, when the at least one arm is in the first position, the first section and the second section are positioned along the seat back; and
- wherein, when the at least one arm is in the second position, the first section is substantially horizontal with respect to the seat back.

EXAMPLE S

The support of any of the proceeding or subsequent examples, wherein, when the at least one arm moves between the first and second positions, an end of the at least one arm moves along an arcuate path; and
- wherein, when the base moves between the stowed and deployed positions, a lower end of the base moves along an arcuate path.

EXAMPLE T

The support of any of the proceeding or subsequent examples, wherein the at least one arm comprises two arms.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A support for holding a portable electronic device comprising:
    - at least one arm comprising a first end and a second end, the first end coupled to a seat back, the at least one arm having a first position and a second position;
    - a base pivotably coupled to the at least one arm, the base comprising:
        - a top end pivotably coupled directly to the second end of the at least one arm;
        - a bottom end;
        - a forward surface;
        - an aft surface; and
        - a retaining ledge extending outwards from the bottom end of the base opposite from the at least one arm and curved towards the forward surface, wherein the base is configured to receive the portable electronic device between the retaining ledge and the forward surface, wherein the base comprises a stowed position and a deployed position;

wherein, when the at least one arm is in the first position, the arm is disposed proximate the seat back, wherein, when the at least one arm is in the second position, the at least one arm extends outwards from the seat back, wherein, when the base is in the stowed position, a forward surface of the base faces towards the seat back;

wherein, when the base is in the deployed position, the forward surface of the base faces away from the seat back; and wherein, when the base moves between the stowed and deployed positions, the base rotates about the second end of the at least one arm.

2. The support of claim 1, wherein the seat back further comprises at least one slot comprising a first end and a second end; and wherein the first end of the at least one arm translates within the at least one slot between the first end and the second end to move the at least one arm between the first position and the second position.

3. The support of claim 1, wherein the seat back further comprises a tray table coupled to the seat back above or below the base, wherein, the at least one arm can move between the first and second positions while the tray table is in a deployed position; and wherein, the base can move between the stowed and deployed positions while the tray table is in the deployed position.

4. The support of claim 1, wherein the at least one arm comprises a first section, a second section;

wherein the first section and the second section each extend linearly from an intersection and such that the first section and the second section are oriented at a non-zero angle with respect to each other; and wherein, the first section is coupled to the seat back and the second section is coupled to the base.

5. The support of claim 4, wherein when the base is in the stowed position, the base is oriented along a same axis as the second section of the at least one arm.

6. The support of claim 4, wherein, when the at least one arm is in the first position, the first section and the second section are positioned along the seat back; and wherein, when the at least one arm is in the second position, the first section is substantially horizontal with respect to the seat back.

7. The support of claim 1, wherein, when the at least one arm moves between the first and second positions, the first end of the at least one arm moves along an arcuate path; and wherein, when the base moves between the stowed and deployed positions, the lower end of the base moves along an arcuate path.

8. The support of claim 1, wherein the at least one arm comprises two arms, each pivotably coupled to the top end of the base.

9. The support of claim 1, wherein a width of the retaining ledge is less than a width of the base.

10. The support of claim 1, wherein the base is movable between the stowed position and the deployed position while the arm is in the first position.

* * * * *